May 9, 1939.  C. H. HOFFSTETTER ET AL  2,157,608
STOVE AND RANGE
Filed Oct. 19, 1938  2 Sheets-Sheet 2

INVENTORS
Carl H. Hoffstetter and
Robert P. Hoffstetter
BY
Fisher, Moser & Moore
ATTORNEYS Patented May 9, 1939

2,157,608

UNITED STATES PATENT OFFICE 2,157,608

STOVE AND RANGE

Carl H. Hoffstetter and Robert F. Hoffstetter, Erie, Pa.

Application October 19, 1938, Serial No. 235,903

6 Claims. (Cl. 126—339)

This invention relates to stoves and ranges, and has for its principal object to provide improved means for manipulating oven racks and the like.

In our prior Patent No. 2,088,957 we have disclosed a frame or rack having a bottom wall which functions as the bottom of the oven, when the rack is in normal cooking position within the oven, the rack being slidably mounted to permit moving it out of the oven for convenience in placing cooking vessels in position on the rack or removing the same therefrom. As this rack or frame becomes very hot considerable inconvenience and annoyance was experienced by the user when pulling the same out of the oven. According to the present invention means is provided for performing the operation by rolling the rack or frame out of or back into the oven which does not necessitate touching hot parts with the hands.

Other objects and advantages will be apparent as the description is considered in connection with the accompanying drawings, in which:

Figure 5 is an enlarged fragmentary sectional view of the oven and oven rack; and Figure 6 is a detail view of the oven rack actuating shaft.

Figure 1:
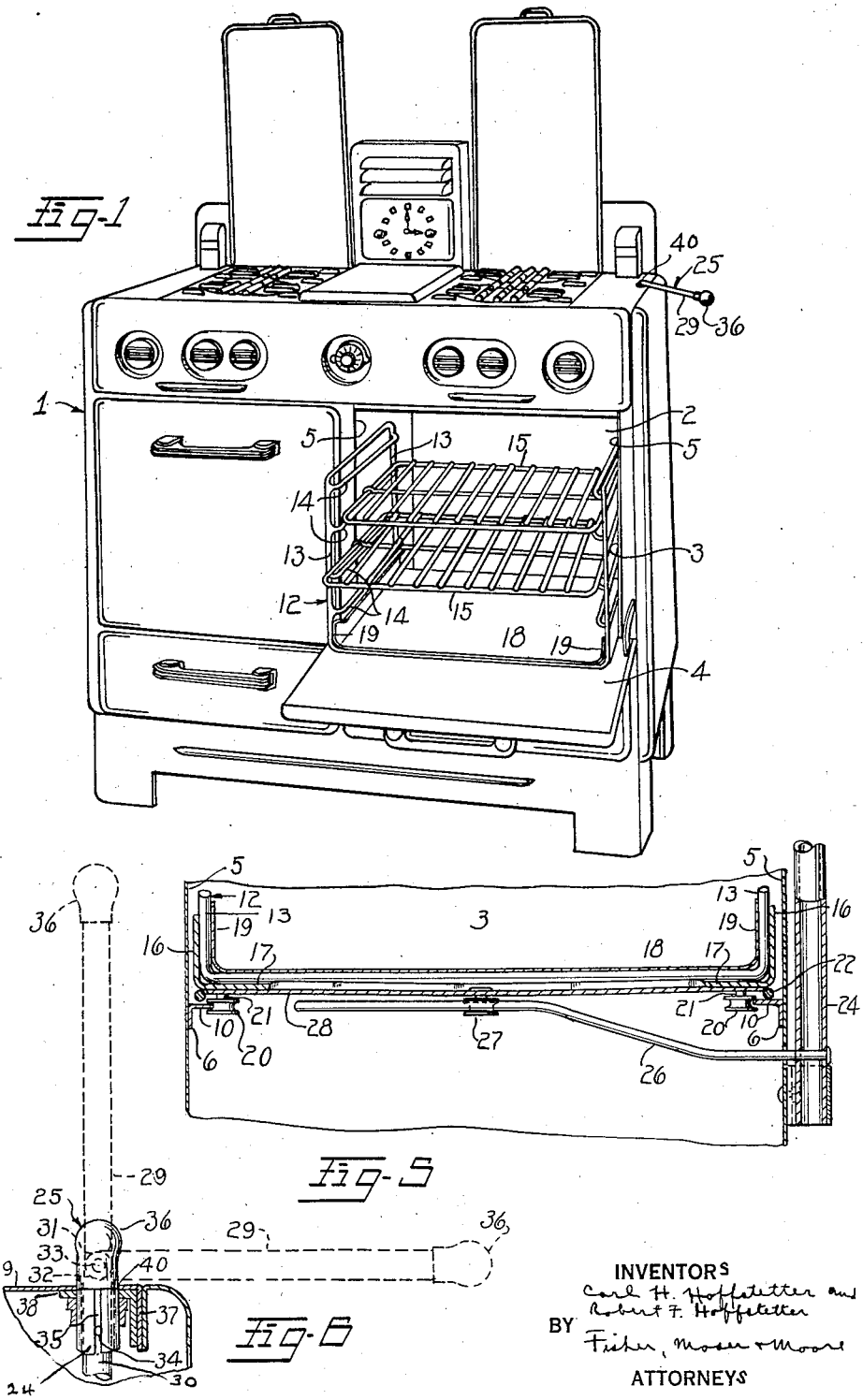
Figure 1 is a perspective view of a stove embodying our improved oven rack and operating means therefor.
Figures 2, 4:
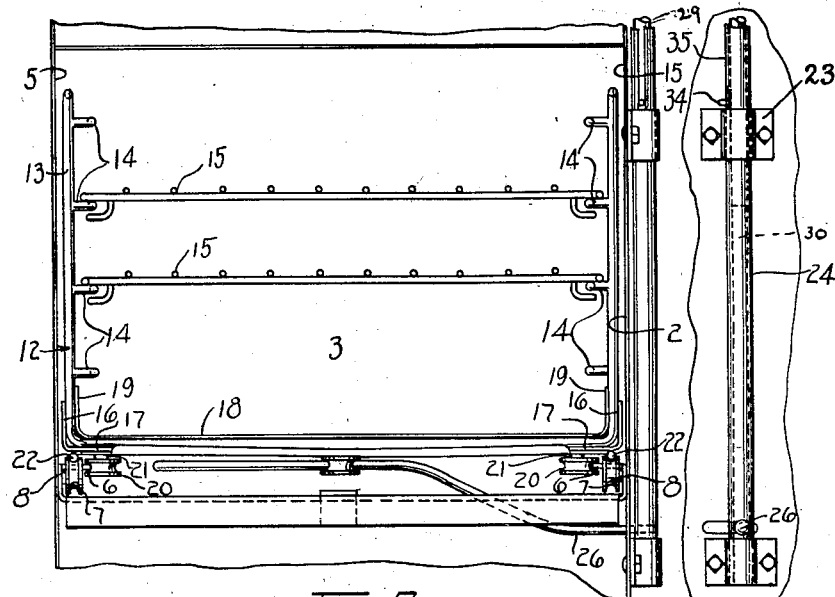
Figure 2 is a fragmentary front view of the oven showing the oven rack in retracted position.
Figure 4 is an end view of Figure 2.
Figure 3:
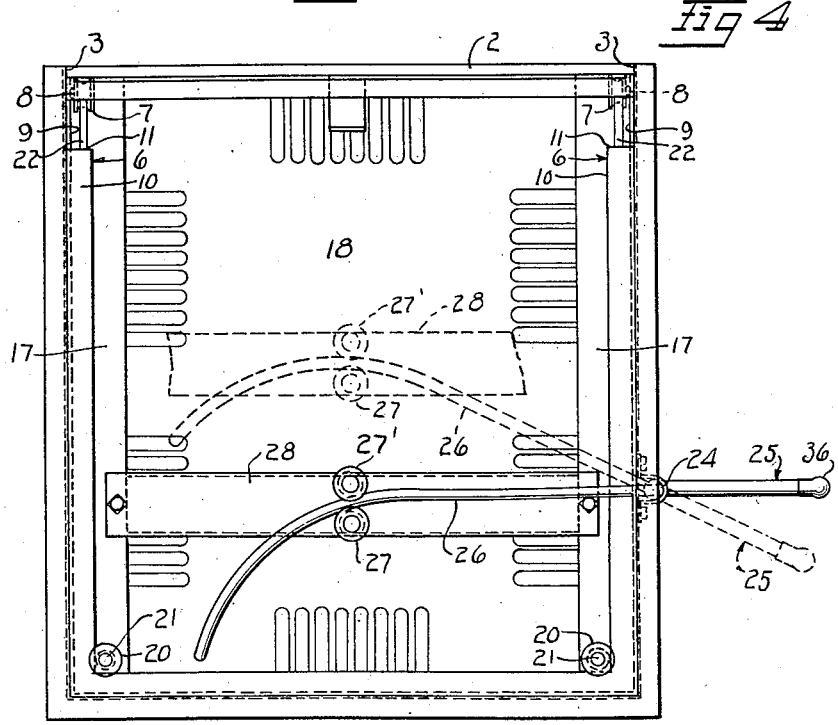
Figure 3 is a bottom plan view of the oven showing in dotted lines the position assumed by the oven rack actuating arm.

Having more particular reference to the drawings I denotes a conventional stove or range, provided with an oven 2, the door opening 3 of which is adapted to be closed by a door 4, pivotally hinged at its lower end in any suitable manner for swinging movement about a horizontal axis.

Secured in any suitable manner to each of the side walls 5 of the oven 2 is a horizontally disposed angle iron runner or track 6. These runners carry vertically disposed grooved rollers 7, journaled on studs 8 fixed to the forward ends of vertical side flanges 9. The horizontal flanges 10 of the runners or tracks 6 are cut away at their forward ends to provide openings 11 through which the periphery of the rollers extend, the latter being on a plane slightly above the top face of the horizontal flanges 10 for a purpose presently understood.

Mounted for slidable movement in the oven is a rack 12 comprising front and rear substantially U-shaped frame members 13, to the upright portions of which stepped ledges 14 are connected in any suitable manner, such as welding. These ledges slidably receive grids or the like 15 for an obvious purpose. The rack is reinforced at its lower side edges by means of angle iron strips 16, preferably welded to the U-shaped frame members. The horizontal flanges 17 of these strips serve as a support for the bottom of the rack which consists of a rectangular reticulated sheet metal plate 18, having curved side edges 19. If desired the bottom plate 18, which also serves as the oven bottom, may be slidably or removably supported on the rack frame member, but is preferably welded to the reinforcing strips 16.

A pair of horizontally disposed grooved rear rollers 20 are mounted on stud shafts 21 secured to each of the horizontally disposed flanges 17 of the angle strips 16, adjacent the rear ends of the latter. These rollers ride on the horizontally disposed flanges 10 of the tracks or runners 6, when assembly is effected by positioning the rollers in alinement with the cut away front ends of flanges 10 and pushing the rack 6 rearwardly. Round strips 22, welded to the bottom face of flanges 10, seat on the vertically disposed rollers 7 and also serve as runners or tracks when the rack is moved to and fro through the oven door opening 3.

Rotatably mounted in straps 23, secured to the outer face of one of the side walls 5, is a rack actuating shaft 24, which enables the housewife to move the rack 12 into and out of the oven by appropriate manipulation of a handle member 25, thus avoiding the danger of burning the hands through direct contact with the oven rack. Thus the lower end of the shaft is connected to one end of a rearwardly curved or cam shaped arm 26, the other end of which is movably confined between a pair of grooved rollers 27 and 27', mounted on a metal brace 28, extending between and welded to the flanges 17 of reinforcing strips 16. The upper end of the shaft 24 is hollow to slidably receive the upper and lower sections 29 and 30 of the jointed handle member 25. These sections are formed with interfitting male and female parts 31 and 32 respectively, which are pivotally connected to each other by pivot pin 33. A cross key 34 extending through the handle section 30 and engaging loosely in oppositely disposed slots 35, formed in the shaft, lock the handle and shaft against relative rotary movement.

In order to withdraw the rack from the oven it is merely necessary for the user to pull the upper section 29 of handle 25 out of the hollow upper end of shaft 24, sufficiently far to permit this section to be swung forwardly on its pivot to a substantially horizontal position. Movement of the handle in an anti-clockwise direction will now cause shaft 24 to rotate in a corresponding direction and the curved end of cam arm 26 to exert an outward pushing force against the foremost roller 27' which in turn moves the rack out of the oven. Reverse or clockwise movement of the handle causes the cam arm to exert an inward pushing force against roller 27 thus returning the rack to its former position within the oven.

The length of the section 29 of handle 25 provides sufficient leverage to insure ease of operation. When the handle is not in use, the section 29 can be folded to vertical position and dropped by gravity into concealed position within the shaft 24, leaving only the knob 36 exposed. It will also be noted that the shaft 24 extends downwardly through the heat insulating space between the side wall 5 of the oven and the side wall 37 of the range and is thus entirely hidden from view. A small apertured plate 38, bolted or otherwise suitably secured to the top frame of the stove, beneath the sheet metal top 39 thereof, serves to support or steady that end of the shaft. The upper end of shaft 24 extends through this plate, but preferably terminates below the sheet metal top 39, and is thus concealed from view. However it is contemplated that the upper extremity of the shaft could be extended into the aligned opening 40 in the top 39, provided it does not project above the top face thereof. This plate also serves as a stop to limit the extent to which the handle may be withdrawn from the shaft 24, when the cross key or pin 34 strikes the bottom of the plate.

Having thus described our invention,

What we claim is:

1. In a cooking range, an oven open at its front end, a rack slidably mounted in said oven and having a bottom, means for moving said rack into and out of the oven, said means comprising a hollow shaft rotatably mounted adjacent one side wall of the oven, an arm fixed to said shaft at one end, the other end of said arm extending through said side wall, and being curved to engage said bottom to move said rack into and out of said oven when said rack is appropriately rotated and means for rotating said shaft.

2. In a cooking range, an oven open at its front, a rack having a bottom adapted to serve as a bottom for said oven, means for moving said rack into and out of said oven, said means comprising a vertically disposed shaft, a cam shaped substantially horizontally disposed arm fixed to said shaft, means on said bottom slidably engaged by said arm to force said rack inwardly or outwardly when said shaft is appropriately rotated, and means for rotating said shaft.

3. In a cooking range, an oven open at its front end, a rack slidably mounted in said oven and having a bottom, a pair of rollers fixed to said bottom, means for moving said rack into and out of the oven, said means comprising a shaft rotatably mounted adjacent one side wall of the oven, an arm fixed to said shaft at one end, the other end of said arm extending through said side wall, and being curved to engage between said rollers to move said rack into and out of said oven when said rack is appropriately rotated and means for rotating said shaft.

4. In a cooking stove, an oven having a door opening, a pan support slidably supported in said oven and having a bottom, means for moving said pan support into and out of said oven through said opening, said means comprising a shaft, a pair of spaced members fixed to said bottom, an arm fixed to said shaft at one end and having a curved portion at the other end extending between said spaced members, said curved arm adapted to exert a pushing force against one of said spaced members to move said rack in one direction upon rotation of the shaft in one direction and to exert a pushing force against the other of said spaced members to reverse the movement of said rack when the rotation of said shaft is reversed, and means for rotating said shaft.

5. In a cooking range, an oven open at its front end, a rack mounted for to and fro movement into and out of said oven through said opening and having a bottom, means for actuating said rack, said means comprising a shaft, an arm fixed to said shaft at one end, the other end of said arm being curved and slidably engaging said rack to force said rack inwardly or outwardly when said shaft is appropriately rotated, said shaft being hollow at its upper end and having an extensible jointed handle slidably but non-rotatably mounted therein for rotating the shaft.

6. In a cooking range, an oven open at its front end, a rack mounted for to and fro movement into and out of said oven through said opening and having a bottom, means for actuating said rack, said means comprising a shaft, an arm fixed to said shaft at one end, the other end of said arm being curved and slidably engaging said rack to force said rack inwardly or outwardly when said shaft is appropriately rotated, said shaft having a hollow slotted upper end substantially flush with or below the top of the range, an extensible jointed handle portion slidably mounted in said hollow end for rotating said shaft, said handle portion having a key engaging in the slot of the shaft to prevent relative rotation of said shaft and handle portion.

CARL H. HOFFSTETTER.
ROBERT F. HOFFSTETTER.